United States Patent
Iwaki et al.

(10) Patent No.: US 10,359,669 B2
(45) Date of Patent: Jul. 23, 2019

(54) DISPLAY APPARATUS WITH SPACER AND METHOD OF MANUFACTURE OF DISPLAY APPARATUS WITH SPACER

(71) Applicant: Sakai Display Products Corporation, Sakai-shi, Osaka (JP)

(72) Inventors: Takashi Iwaki, Sakai (JP); Nobuhiro Yonezawa, Sakai (JP); Daishi Ishikawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/324,418

(22) PCT Filed: Sep. 26, 2014

(86) PCT No.: PCT/JP2014/075695
§ 371 (c)(1),
(2) Date: Jan. 6, 2017

(87) PCT Pub. No.: WO2016/046972
PCT Pub. Date: Mar. 31, 2016

(65) Prior Publication Data
US 2017/0205654 A1    Jul. 20, 2017

(51) Int. Cl.
*G02F 1/1339*    (2006.01)
*G02F 1/1333*    (2006.01)

(52) U.S. Cl.
CPC .... *G02F 1/13394* (2013.01); *G02F 1/133308* (2013.01); *G02F 2001/13398* (2013.01);
(Continued)

(58) Field of Classification Search
CPC ... G02F 1/133308; G02F 2001/133317; G02B 6/0088
See application file for complete search history.

(56) References Cited

U.S. PATENT DOCUMENTS 8,147,113 B2    4/2012    Hamada
8,459,857 B2    6/2013    Shibata et al.
(Continued)

FOREIGN PATENT DOCUMENTS

CN    1847942 A    10/2006
CN    101943351 A    1/2011
(Continued)

OTHER PUBLICATIONS

Sharpe, Foam Rubber vs, Sponge Rubber: What's the difference?, Elasto Proxy Inc., Web Page, Feb. 24, 2017, 3 pages.
(Continued)

*Primary Examiner* — Sean P Gramling
*Assistant Examiner* — Keith G. Delahoussaye
(74) *Attorney, Agent, or Firm* — Rudy J. Ng; Bret E. Field; Bozicevic, Field & Francis LLP

(57) ABSTRACT

A display apparatus according to one embodiment of the present disclosure comprises a display panel, a light guiding plate that emits light, the light being derived from a light source, through a front surface of the light guiding plate toward a rear surface of the display panel, a spacer that forms a void between the display panel and the light guiding plate, and an optical sheet disposed at the void, the optical sheet having a surface to face the rear surface of the display panel and a surface to face the front surface of the light guiding plate. In the display apparatus, the spacer is formed using a shape memory alloy. In the display apparatus, the spacer includes a panel attachment part having a plate shape attached to a peripheral part of the rear surface of the display panel so as to be disposed along the display panel, and a light guiding plate attachment part attached to a peripheral part of the front surface of the light guiding plate or a peripheral part of the rear surface of the light guiding plate.

4 Claims, 22 Drawing Sheets

(52) U.S. Cl.
CPC ............ *G02F 2001/133317* (2013.01); *G02F 2001/133322* (2013.01)

(56) References Cited

U.S. PATENT DOCUMENTS

| | | | |
|---|---|---|---|
| 9,025,104 B2 | 5/2015 | Hsiao et al. | |
| 2004/0150981 A1* | 8/2004 | Katsuda | G02B 6/0088 362/620 |
| 2005/0062899 A1 | 3/2005 | Fukuyama et al. | |
| 2011/0069255 A1* | 3/2011 | Choi | G02B 6/0088 349/63 |
| 2012/0140521 A1 | 6/2012 | Kao et al. | |
| 2012/0162546 A1 | 6/2012 | Shimomichi | |
| 2012/0250354 A1 | 10/2012 | Yoshida | |
| 2013/0044271 A1 | 2/2013 | Momose et al. | |
| 2013/0063681 A1 | 3/2013 | Zhou | |
| 2013/0300973 A1* | 11/2013 | Fan | G02B 6/0088 349/58 |
| 2013/0342789 A1 | 12/2013 | Zhang et al. | |
| 2014/0204275 A1 | 7/2014 | Shimizu | |
| 2014/0204310 A1 | 7/2014 | Lee et al. | |
| 2014/0218656 A1 | 8/2014 | Maruno | |
| 2015/0177548 A1 | 6/2015 | Jeon et al. | |
| 2015/0253612 A1* | 9/2015 | Hasegawa | G02F 1/133308 349/58 |

FOREIGN PATENT DOCUMENTS

| | | |
|---|---|---|
| CN | 102720994 A | 10/2012 |
| CN | 102955290 A | 3/2013 |
| CN | 103148416 A | 6/2013 |
| JP | 2007-232809 A | 9/2007 |
| JP | 2012-118498 A | 6/2012 |
| JP | 2014-142614 A | 8/2014 |
| JP | 2014-154931 A | 8/2014 |
| WO | WO2012169441 A1 | 12/2012 |
| WO | WO2013024712 A1 | 2/2013 |

OTHER PUBLICATIONS

Office Action for U.S. Appl. No. 15/320,308 dated Oct. 16, 2017.
Final Office Action for U.S. Appl. No. 15/320,308 dated May 17, 2018.
Office Action for U.S. Appl. No. 15/320,308 dated Oct. 16, 2018.
Office Action for U.S. Appl. No. 15/321,079 dated Oct. 11, 2017.
Final Office Action for U.S. Appl. No. 15/321,079 dated May 8, 2018.
Office Action for U.S. Appl. No. 15/321,079 dated Sep. 28, 2018.

* cited by examiner

F I G. 15
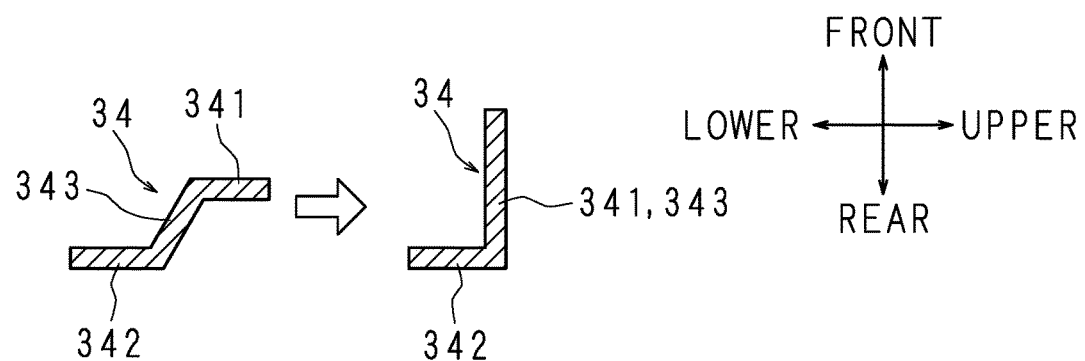

DISPLAY APPARATUS WITH SPACER AND METHOD OF MANUFACTURE OF DISPLAY APPARATUS WITH SPACER

CROSS-REFERENCE TO RELATED APPLICATIONS

This application is the national phase under 35 U. S. C. § 371 of PCT International Application No. PCT/JP2014/075695 which has an International filing date of Sep. 26, 2014 and designated the United States of America.

FIELD

The present invention relates to a display apparatus that includes a display panel, an optical sheet, and a light guiding plate and a method of manufacturing the display apparatus.

BACKGROUND

A liquid crystal display apparatus includes a liquid crystal display panel and a light source device (see Japanese Patent Application Laid-Open Publication No. 2007-232809, which is hereinafter referred to as Patent Document 1).

Conventionally, an edge light type light source device has been proposed. The edge light type light source device includes a light source, a light guiding plate, and an optical sheet group. The light source is disposed to face a peripheral surface of the light guiding plate and the light guiding plate is disposed to face a rear surface of the liquid crystal display panel with the optical sheet group interposed therebetween.

Light derived from the light source enters inside the light guiding plate through the peripheral surface of the light guiding plate. The light entering inside the light guiding plate emits through a front surface of the light guiding plate. The light emitted through the front surface of the light guiding plate enters inside the liquid crystal display panel through the rear surface of the liquid crystal display panel after being diffused and focused by the optical sheet group. That is, the liquid crystal display panel is illuminated toward the rear surface by the light source device.

The liquid crystal display apparatus ("display module" in the document) disclosed in Patent Document 1 includes a spacer that forms a void between the liquid crystal display panel and the light guiding plate. The spacer is interposed between the rear surface of the liquid crystal display panel and the front surface of the light guiding plate. The optical sheet group is disposed at the void between the liquid crystal display panel and the light guiding plate.

In the liquid crystal display apparatus disclosed in Patent Document 1, since the liquid crystal display panel is directly attached to the light guiding plate. Thus, the liquid crystal display apparatus is thin as compared when the liquid crystal display panel and the light guiding plate are individually attached to a support member (for example, a bezel, a P chassis, or the like).

SUMMARY

The liquid crystal display apparatus disclosed in Patent Document 1 is manufactured in such a procedure that the optical sheet group is disposed in a central part of the front surface of the light guiding plate, the spacer is disposed in the peripheral part of the front surface of the light guiding plate, and, subsequently, the spacer is disposed in the peripheral part of the rear surface of the liquid crystal display panel.

However, when the liquid crystal display apparatus is manufactured in such the procedure, the position of the optical sheet may be shifted from the central part of the light guiding plate toward the peripheral part of the light guiding plate during arrangement of the optical sheet group. That is, since the optical sheet unnecessarily covers the position at which the spacer is to be disposed, it is not possible to arrange the spacer in the light guiding plate. Since the position shift of the optical sheet has to be corrected in order to arrange the spacer in the light guiding plate in such a state, the manufacturing procedure of the liquid crystal display apparatus is complex.

It is an object to provide a display apparatus in which a spacer can be attached to a light guiding plate easily and reliably and a method of manufacturing the display apparatus.

A display apparatus according to one embodiment of the present disclosure comprises a display panel, a light guiding plate that emits light, the light being derived from a light source, through a front surface of the light guiding plate toward a rear surface of the display panel, a spacer that forms a void between the display panel and the light guiding plate, and an optical sheet disposed at the void, the optical sheet having a surface to face the rear surface of the display panel and a surface to face the front surface of the light guiding plate. In the display apparatus, the spacer is formed using a shape memory alloy. In the display apparatus, the spacer includes a panel attachment part having a plate shape attached to a peripheral part of the rear surface of the display panel so as to be disposed along the display panel, and a light guiding plate attachment part attached to a peripheral part of the front surface of the light guiding plate or a peripheral part of the rear surface of the light guiding plate.

In the display apparatus according to the embodiment of the present disclosure, the panel attachment part has a flat plate shape. In the display apparatus, the light guiding plate attachment part has a flat plate shape and is disposed along the light guiding plate. In the display apparatus, the spacer further includes a connection part having a plate shape that integrally connects the panel attachment part and the light guiding plate attachment part.

In the display apparatus according to the embodiment of the present disclosure, the connection part integrally connects the peripheral parts of the panel attachment part and the light guiding plate attachment part and has such a flat plate shape that crosses the panel attachment part and the light guiding plate attachment part. In the display apparatus, the spacer is a bent plate having a connecting portion between the panel attachment part and the connection part and having a connecting portion between the light guiding plate attachment part and the connection part. The connecting portions are bent.

In the display apparatus according to the embodiment of the present disclosure, the light guiding plate attachment part has a block shape having a light guiding plate contacting surface that is in contact with the front surface of the light guiding plate and a panel contacting surface that is in contact with the rear surface of the display panel. In the display apparatus, the panel attachment part has a flat plate shape and protrudes from the light guiding plate attachment part in order that a surface of the panel attachment part is flush with the panel contacting surface.

A method of manufacturing the display apparatus according to the embodiment of the present disclosure comprises a forming step of forming a spacer using a shape memory alloy, the spacer including a panel attachment part having a plate shape to be attached to the display panel and a light guiding plate attachment part to be attached to the light guiding plate, a first attaching step of attaching the light guiding plate attachment part of the spacer to a peripheral part of one surface of the light guiding plate or a peripheral part of the other surface of the light guiding plate, an arranging step of arranging the optical sheet to face the one surface after the first attaching step, a changing step of changing a relative direction of the panel attachment part in relation to the light guiding plate attachment part by applying external force to the spacer within a period after the forming step and before the first attaching step or a period after the first attaching step and before the arrangement step, a returning step of returning the relative direction of the panel attachment part to an original direction by heating the spacer after the arrangement step, and a second attaching step of attaching the panel attachment part to a peripheral part of a surface of the display panel, the surface being to face the optical sheet, in order that the panel attachment part is disposed along the display panel after the returning step.

In the embodiment of the present disclosure, the spacer includes the panel attachment part having a plate shape to be attached to the display panel and the light guiding plate attachment part to be attached to the light guiding plate.

First, a manufacturer attaches the light guiding plate attachment part of the spacer to the peripheral part of one surface (front surface) of the light guiding plate or the peripheral part of the other surface (rear surface) of the light guiding plate. Subsequently, the manufacturer arranges the optical sheet to face the one surface of the light guiding plate. After that, the manufacturer attaches the panel attachment part of the spacer to the peripheral part of the surface (rear surface) that is to face the optical sheet of the display panel so as to be disposed along the display panel.

When the display apparatus is manufactured in such a procedure, the optical sheet may not unnecessarily cover the position at which the spacer is attached. As a result, a step of correcting a position shift of the optical sheet that covers the attachment position of the spacer is not necessary. Therefore, the light guiding plate is attached to the spacer easily and reliably.

However, when the display apparatus is manufactured in such the procedure, the panel attachment part may disturb the operation of arranging the optical sheet during arrangement of the optical sheet.

In order to prevent such a problem, the spacer is formed using a shape memory alloy.

The manufacturer changes the relative direction of the panel attachment part in relation to the light guiding plate attachment part by applying external force to the spacer before the light guiding plate attachment part is attached to the light guiding plate (or after the light guiding plate attachment part is attached to the light guiding plate and before the optical sheet is arranged). In this case, the panel attachment part may be in such a relative direction that the panel attachment part does not disturb the operation of arranging the optical sheet during arrangement of the optical sheet.

Subsequently, the manufacturer returns the relative direction of the panel attachment part to an original direction by heating the spacer after the optical sheet is arranged.

Since the panel attachment part is attached to the display panel after the relative direction of the panel attachment part is returned to the original direction, the attachment of the panel attachment part to the display panel may not be disturbed even when the relative direction of the panel attachment part is changed.

In the embodiment of the present disclosure, the spacer integrally includes two flat plate-shaped portions (the panel attachment part and the light guiding plate attachment part) and the plate-shaped portion (the connection part) that connects these two portions. Therefore, it is possible to reduce the size and the weight of the spacer more easily than when the light guiding plate attachment part has a block shape, for example.

In the embodiment of the present disclosure, the spacer is the bent plate that integrally includes two flat plate-shaped portions (the panel attachment part and the light guiding plate attachment part) and the flat plate-shaped portion (the connection part) that connects these two portions. Therefore, it is possible to easily form the spacer by bending a flat plate member, for example.

In the embodiment of the present disclosure, the panel attachment part of the spacer and the panel contacting surface of the light guiding plate attachment part reliably support the display panel. Moreover, since the panel attachment part has the flat plate shape and the light guiding plate attachment part has the block shape, the possibility that the spacer is deformed unnecessarily even when unnecessary external force is applied is lower than when the spacer has a plate-like shape in a portion other than the panel attachment part, for example. That is, the reliability of the spacer is high.

According to the display apparatus and the method of manufacturing the display apparatus according to the embodiment of the present disclosure, since the spacer is attached to the light guiding plate, the optical sheet is arranged, and subsequently, the spacer is attached to the display panel, it is possible that the spacer can be attached to the light guiding plate easily and reliably.

This is because the position shift of the optical sheet does not occur since the spacer attached in advance to the light guiding plate defines the range in which the optical sheet is to be arranged (that is, the position of the optical sheet is determined). Therefore, the optical sheet in which a position shift occurs may not unnecessarily cover the attachment position of the spacer. Furthermore, it is not necessary to correct the position shift of the optical sheet.

The above and further objects and features will more fully be apparent from the following detailed description with accompanying drawings.

BRIEF DESCRIPTION OF THE DRAWINGS

FIG. 15 is a side view for describing deformation of a spacer provided in a display apparatus according to Embodiment 5 of the present disclosure.

DETAILED DESCRIPTION

Figure 1:
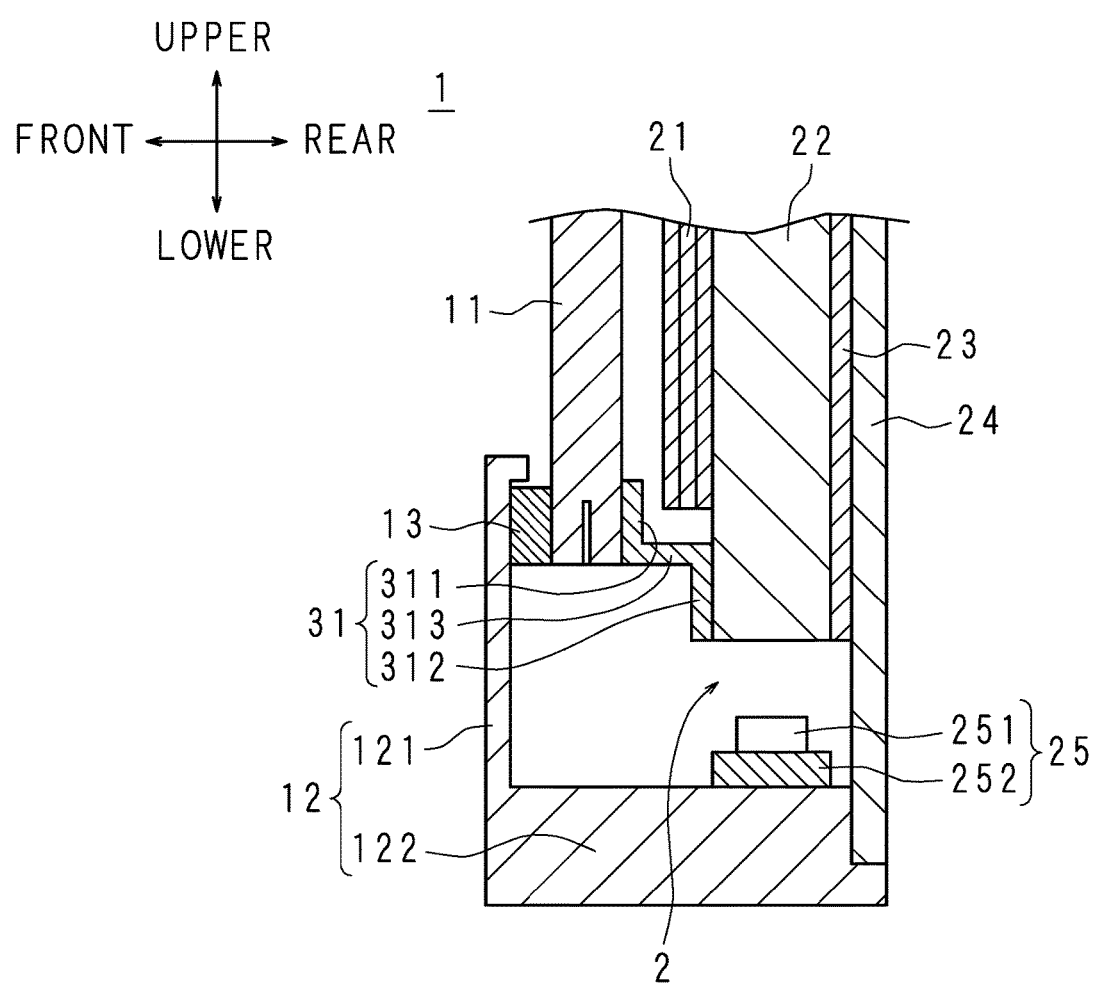
FIG. 1 is a side view schematically illustrating an inner configuration of a display apparatus according to Embodiment 1 of the present disclosure.

The present disclosure will be described below in detail with reference to the drawings illustrating the embodiments thereof. In the following description, upper, lower, front, rear, left and right are used as indicated by the arrows in the drawings.

Embodiment 1

FIG. 1 is a side view schematically illustrating an inner configuration of a display apparatus according to Embodiment 1 of the present disclosure.

The display apparatus 1 of the present embodiment is configured as a television receiver, an electronic signboard, or a monitor or the like for personal computers, for example.

First, respective parts of the display apparatus 1 will be described.

The display apparatus 1 includes a display panel 11, a frame 12, a shock absorbing part 13, a light source device 2, and spacers 31.

The light source device 2 includes the optical sheet group 21, a light guiding plate 22, a reflecting sheet 23, a BL chassis 24, and a light source 25.

The display panel 11 has a rectangular form, and in the present embodiment, is disposed in a vertical direction. The display panel 11 is a liquid crystal display panel. The display panel 11 has a glass substrate facing forward and a glass substrate facing backward, and a liquid crystal is enclosed between the two glass substrates. Light transmittance of the display panel 11 changes according to a voltage applied to the liquid crystal of the display panel 11. A rectangular display region (corresponding to a portion of the display panel 11 in which the liquid crystal is enclosed) and a rectangular frame region (corresponding to a peripheral part of the display panel 11) that surrounds the display region are provided in the display panel 11.

The frame 12 includes a front surface part 121 and a side surface part 122 that are integrated with each other.

The front surface part 121 has a rectangular frame shape and covers the frame region of the display panel 11 from front in a state in which the display region of the display panel 11 is exposed through an opening of the rectangular frame. The rectangular frame-shaped shock absorbing part 13 is disposed between the front surface part 121 and the frame region of the display panel 11.

The side surface part 122 has a cylindrical shape that is rectangular in a front-rear direction and protrudes backward from an outer circumference of the front surface part 121.

The optical sheet group 21 is formed by stacking a plurality of rectangular optical sheets. The respective optical sheets that form the optical sheet group 21 have a function of diffusing or focusing light. The front surface of the optical sheet group 21 is disposed to face the rear surface of the display panel 11. The optical sheet group 21 covers at least the display region of the display panel 11 on the rear surface of the display panel 11.

The light guiding plate 22 has a rectangular plate shape. The light guiding plate 22 is formed using an acryl resin, for example. The front surface of the light guiding plate 22 is disposed to face the rear surface of the optical sheet group 21 with an appropriate distance from the rear surface of the display panel 11. That is, the optical sheet group 21 is disposed at a void throughout an entire area between the display panel 11 and the light guiding plate 22. The upper side of the optical sheet group 21, for example, is bonded to an upper side of the light guiding plate 22. The light guiding plate 22 covers the entire surface of the optical sheet group 21 on the rear surface of the optical sheet group 21.

The light guiding plate 22 is configured so that light entering inside the light guiding plate 22 emits through the front surface of the light guiding plate 22. Due to this, a plurality of reflecting parts (not illustrated) is provided on the rear surface of the light guiding plate 22. Light entering the reflecting part is reflected forward.

The reflecting sheet 23 has a rectangular shape. The front surface of the reflecting sheet 23 covers the entire rear surface of the light guiding plate 22 and is disposed in close-contact with the rear surface of the light guiding plate 22. Therefore, light emitted through the rear surface of the light guiding plate 22 is reflected to a reflecting sheet 23 and is incident again on the light guiding plate 22.

The BL chassis 24 has a plate shape. The peripheral part of the BL chassis 24 is connected to a rear end of the side surface part 122 of the frame 12. The central part of the front surface of the BL chassis 24 is disposed to face the rear surface of the reflecting sheet 23 in a close-contact state. The light guiding plate 22 and the reflecting sheet 23 are attached to the central part of the BL chassis 24.

The light source 25 is disposed under the light guiding plate 22 and is supported on the inner surface of the side surface part 122 of the frame 12 with a heat sink (not illustrated) interposed therebetween.

The light source 25 includes a plurality of LEDs 251 and an LED substrate 252.

The LED substrate 252 has a rectangular form in a horizontal direction that is long in the left-right direction. The upper surface of the LED substrate 252 is disposed to face the lower end of the light guiding plate 22.

The LEDs 251 are mounted regularly on the upper surface of the LED substrate 252 in a line in the left-right direction. The LEDs 251 and the lower end of the light guiding plate 22 are arranged to face each other with an appropriate distance interposed therebetween.

The light source device 2 may include a plurality of light sources instead of the light source 25. For example, two light sources each may be disposed on both sides in the upper-lower direction or the left-right direction of the light guiding plate 22.

Alternatively, one light source may be disposed in any one of the upper side, the left side, and the right side of the light guiding plate 22.

The void between the display panel 11 and the light guiding plate 22 is formed when four spacers 31 (only one is illustrated in FIG. 1) are interposed between the peripheral part of the rear surface (the rear surface) of the display panel 11 and the peripheral part of the front surface of the light guiding plate 22.

The four spacers 31 correspond to the upper side, the lower side, and the left and right sides of each of the display panel 11 and the light guiding plate 22 in one-to-one correspondence. Since these spacers have the same configuration, the spacer 31 (the spacer 31 illustrated in FIG. 1) corresponding to the lower side of each of the display panel 11 and the light guiding plate 22 will be described below.

The spacer 31 is formed using a shape memory alloy. The spacer 31 includes a panel attachment part 311, a light guiding plate attachment part 312, and a connection part 313 that are integrated with each other.

The panel attachment part 311 (and the light guiding plate attachment part 312) is attached to the peripheral part of the rear surface of the display panel 11 (and the front surface of the light guiding plate 22) so as to be disposed along the display panel 11 (and the light guiding plate 22). Specifically, the panel attachment part 311 and the light guiding plate attachment part 312 have a rectangular flat plate shape having a vertical direction that is narrow and long in the left-right direction. The front surface of the panel attachment part 311 is bonded to the lower side of the rear surface of the display panel 11. The rear surface of the light guiding plate attachment part 312 is bonded to the lower side of the front surface of the light guiding plate 22.

The connection part 313 has a rectangular flat plate shape having a horizontal direction that is narrow and long in the left-right direction and is orthogonal to the panel attachment part 311 and the light guiding plate attachment part 312. The connection part 313 integrally connects the lower side of the panel attachment part 311 and the upper side of the light guiding plate attachment part 312. In other words, the panel attachment part 311 and the light guiding plate attachment part 312 protrude at the right angle in an opposite direction from the front side and the rear side of the connection part 313.

That is, the spacer 31 is a bent plate obtained by bending a flat plate member in a deformed Z-shape.

The rear surface of the panel attachment part 311 is disposed to face the lower side of the front surface of the optical sheet group 21.

Next, illumination of the display panel 11 by the light source device 2 will be described.

Light derived from the light source 25 enters inside the light guiding plate 22 through the lower end surface of the light guiding plate 22.

A part of the light entering inside the light guiding plate 22 is reflected from the front surface, the rear surface, or the reflecting part of the light guiding plate 22 and emits through the front surface toward the optical sheet group 21. Another part of the light entering inside the light guiding plate 22 emits through the rear surface of the light guiding plate 22 and is reflected from the reflecting sheet 23 to enter inside the light guiding plate 22 again.

The light emitted toward the optical sheet group 21 enters inside the display panel 11 from the rear surface of the display panel 11 while being diffused and focused by the optical sheet group 21.

As described above, the display panel 11 is illuminated toward the rear surface by the light source device 2. The light entering inside the display panel 11 passes through the display panel 11 or the passage through the display panel 11 is blocked. As a result, a video is displayed in the display region of the display panel 11.

Next, a procedure of manufacturing the display apparatus 1 will be described.

Figure 2:
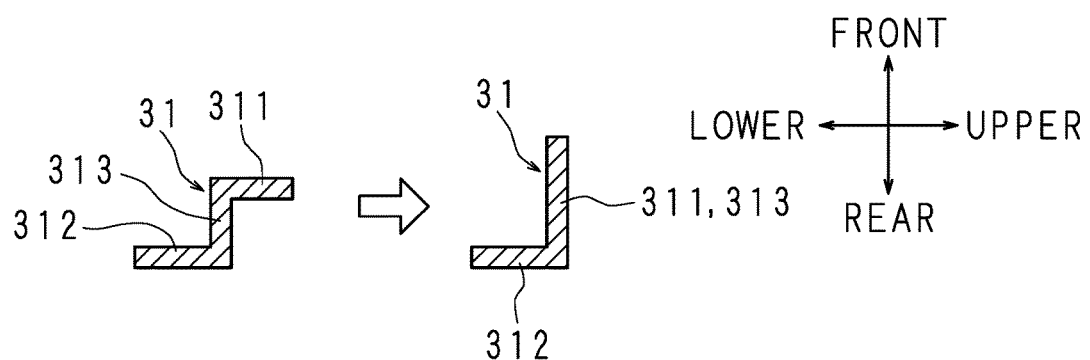
FIG. 2 is a side view for describing deformation of a spacer provided in the display apparatus.

FIG. 2 is a side view for describing deformation of the spacer 31.

Figure 3:
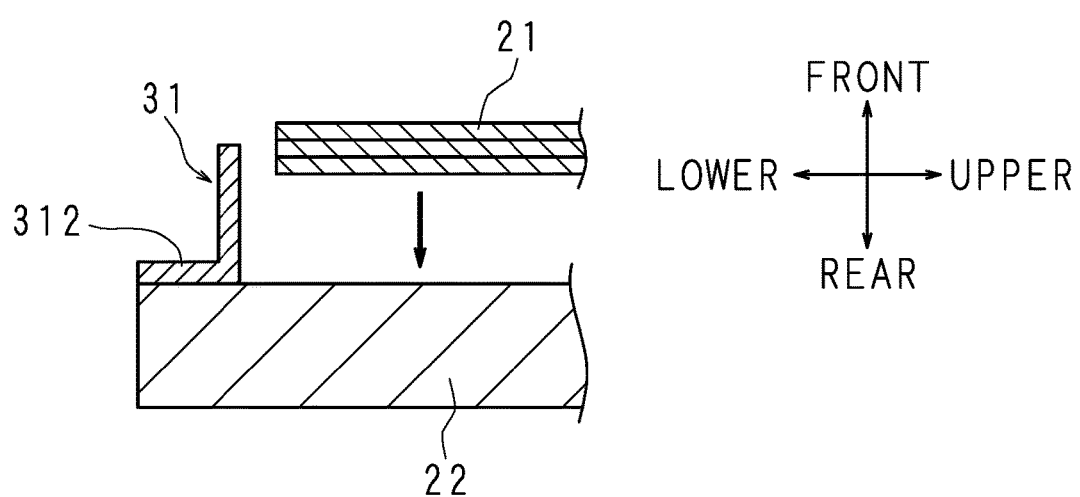
FIG. 3 is a side view for describing a method of manufacturing the display apparatus.
Figure 4:
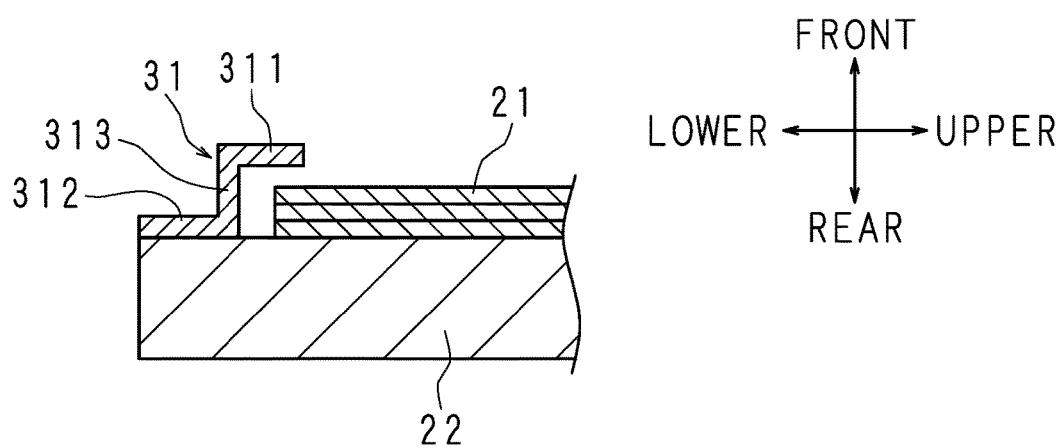
FIG. 4 is a side view for describing the method of manufacturing the display apparatus.
Figure 5:
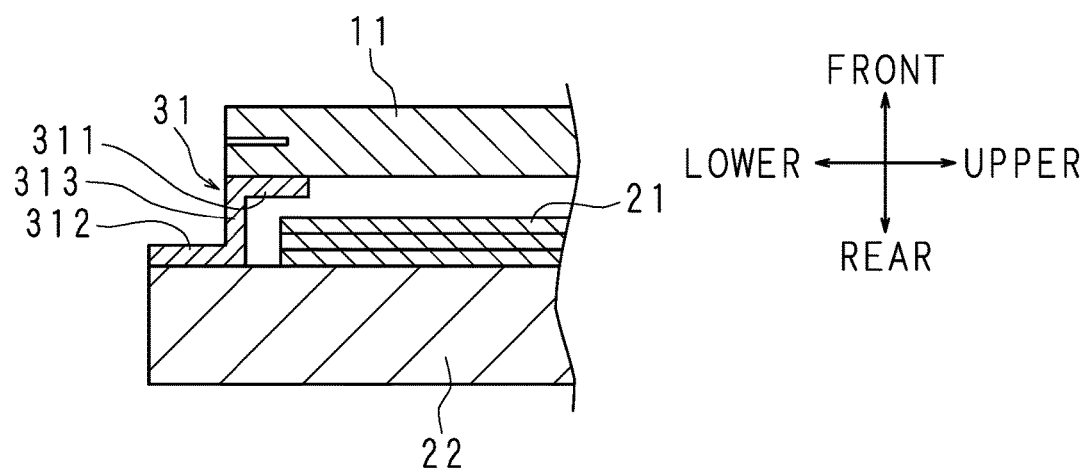
FIG. 5 is a side view for describing the method of manufacturing the display apparatus.

FIGS. 3 to 5 are side views for describing a method of manufacturing the display apparatus 1.

In order to simplify the description, the upper-lower direction, the front-rear direction, and the left-right direction in FIGS. 2 to 5 correspond to the upper-lower direction, the front-rear direction, and the left-right direction in FIG. 1. Moreover, the reflecting sheet 23 and the BL chassis 24 are not illustrated in FIGS. 3 to 5 for better understanding of the drawings.

First, a manufacturer attaches the reflecting sheet 23 and the light guiding plate 22 to the BL chassis 24 in that order (this step is not illustrated).

Moreover, the manufacturer forms the spacer 31 using a shape memory alloy (a forming step, see the spacer 31 on the left side in FIG. 2). In this step, the manufacturer prepares a flat plate member formed of a shape memory alloy, for example, and bends the flat plate member in a deformed Z-shape while performing a heat treatment at a predetermined temperature higher than the room temperature.

And then, the spacer 31 is cooled to a temperature lower than the predetermined temperature.

Subsequently, the manufacturer changes the relative direction of the panel attachment part 311 with respect to the light guiding plate attachment part 312 by adding external force to the spacer 31 (a changing step, see the spacer 31 on the right side in FIG. 2). Specifically, the relative direction of the panel attachment part 311 is changed to a horizontal direction like the connection part 313. In this case, the spacer 31 has an L-shaped cross-section and the rear surface of the panel attachment part 311 and the upper surface of the connection part 313 are flush with each other.

After that, the manufacturer applies an adhesive to the rear surface of the light guiding plate attachment part 312 of the spacer 31 to attach the light guiding plate attachment part 312 to the lower side of the front surface of the light guiding plate 22 (see FIG. 3, a first attaching step). During the attachment, the spacer 31 is oriented in such a direction that the rear surface of the panel attachment part 311 and the upper surface of the connection part 313 that are flush with each other face upward.

Similarly, the manufacturer attaches the light guiding plate attachment part 312 of the spacer 31 to the upper side and the left and right sides of the front surface of the light guiding plate 22.

In this case, since the optical sheet group 21 is not disposed on the front surface of the light guiding plate 22, the spacers 31 can be attached to the light guiding plate 22 easily and reliably.

Subsequently, the manufacturer arranges the optical sheet group 21 to face the front surface of the light guiding plate 22 to attach the upper side of the optical sheet group 21 to the upper side of the light guiding plate 22 (see FIG. 3, an arrangement step). In this case, an arrangement position of the optical sheet group 21 is defined by the spacer 31 (specifically, the arrangement position is limited to a range surrounded by the four spacers 31 attached to the four sides of the light guiding plate 22). That is, the position of the optical sheet group 21 is determined. In other words, a position shift of the optical sheet group 21 does not occur.

After that, the manufacturer heats the spacer 31 to a predetermined temperature or higher. As a result, the relative direction of the panel attachment part 311 returns to an original direction due to the property of the shape memory alloy (see FIG. 4, a returning step).

Subsequently, the manufacturer applies an adhesive to the front surfaces of the panel attachment parts 311 of the four spacers 31 to attach the panel attachment parts 311 to the four sides of the rear surface of the display panel 11 (see FIG. 5, a second attaching step).

As a result, the light guiding plate 22 supports the display panel 11 with the spacers 31 interposed therebetween and supports the optical sheet group 21.

Moreover, the manufacturer attaches the light source 25 to the side surface part 122 of the frame 12 with a heat sink interposed therebetween (this step is not illustrated).

After that, the manufacturer arranges the front surface part 121 of the frame 12 in the peripheral part of the display panel 11 with the shock absorbing part 13 interposed therebetween and attaches the side surface part 122 to the BL chassis 24 (see FIG. 1).

In the present embodiment, although the changing step is executed after the forming step and before the first attaching step, the present disclosure is not limited to this and the changing step may be executed after the first attaching step and before the arrangement step. However, in the latter case, since it is necessary to be careful so that the light guiding plate attachment part 312 is not separated from the light guiding plate 22 when external force is applied to the spacer 31, the former is more ideal than the latter.

Moreover, in the present embodiment, although the spacer 31, the optical sheet group 21, and the display panel 11 are arranged in relation to the light guiding plate 22 in that order, the present disclosure is not limited to this, and the spacer 31, the optical sheet group 21, and the light guiding plate 22 may be arranged in relation to the display panel 11 in that order. In this case, since the display panel 11 is generally thin and more fragile than the light guiding plate 22, the former is more ideal than the latter.

Figure 6:
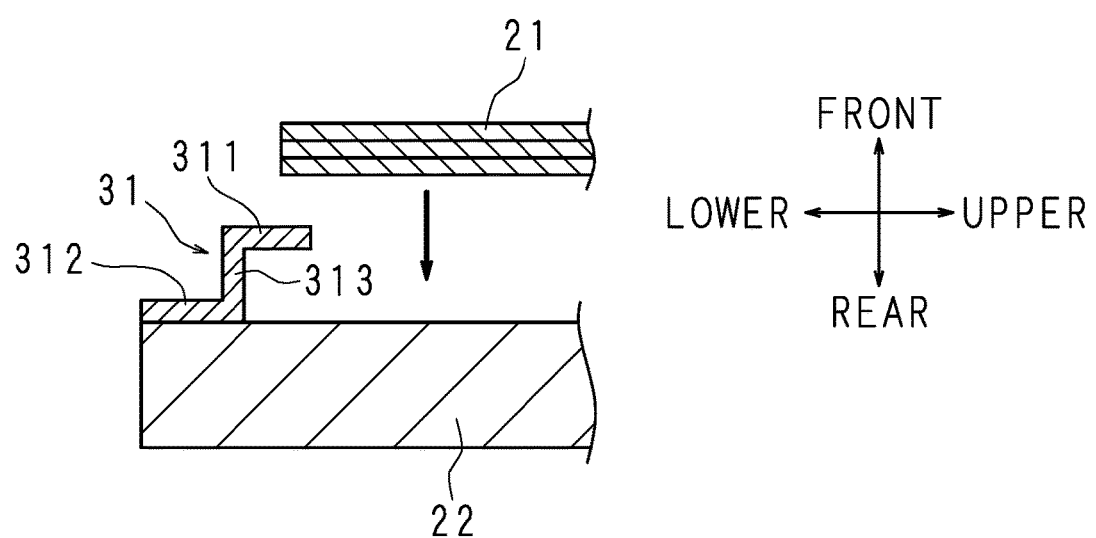
FIG. 6 is a side view for describing the effect of the method of manufacturing the display apparatus.
Figure 7:
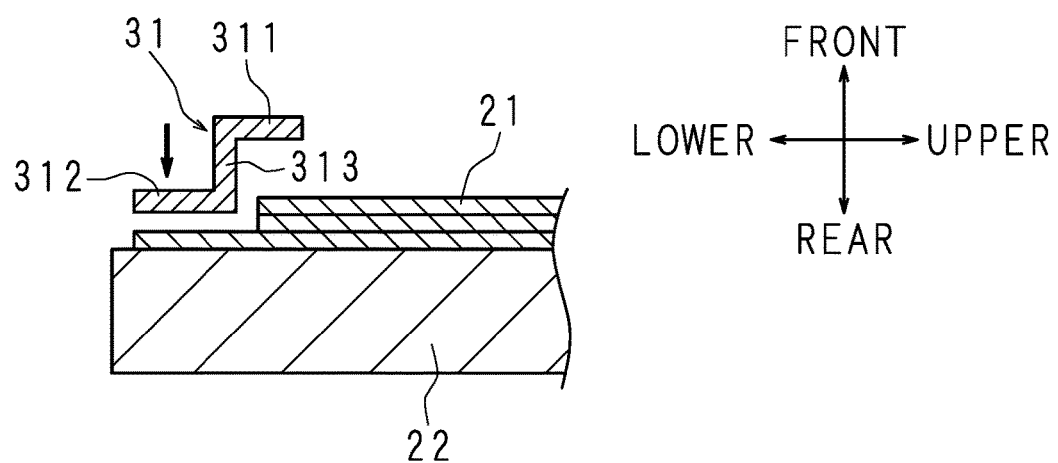
FIG. 7 is a side view for describing the effect of the method of manufacturing the display apparatus.

FIGS. 6 and 7 are side views for describing the effect of the method of manufacturing the display apparatus 1.

FIG. 6 illustrates a procedure in which the first attaching step is performed without performing the changing step. In this case, it is not necessary to perform the returning step.

However, during execution of the first attaching step, the manufacturer has to allow the panel attachment parts 311 of the four spacers 31 to detour to the optical sheet group 21 by bending the optical sheet group 21, for example, and then, to insert the optical sheet group 21 between the panel attachment parts 311 and the light guiding plate 22 to attach the light guiding plate 22. That is, the arrangement procedure of the optical sheet group 21 is complex.

In other words, by performing the first attaching step after performing the changing step, it is possible to simplify the arrangement procedure of the optical sheet group 21.

FIG. 7 illustrates a procedure in which the arrangement step is performed before the first attaching step is performed without performing the changing step. In this case, it is not necessary to perform the returning step.

However, during execution of the arrangement step, since an element for positioning the optical sheet group 21 on the light guiding plate 22 is not present, a position shift of the optical sheet group 21 or the optical sheet included in the optical sheet group 21 may occur to cover a portion of the spacer 31 to that the light guiding plate attachment part 312 is to be attached.

When the position shift of the optical sheet group 21 is not noticed, since the manufacturer may attach the spacer 31 to the optical sheet group 21, the attachment between the display panel 11 and the light guiding plate 22 via the spacer 31 is loose.

In order to eliminate such a problem, it is necessary to examine the presence of a position shift of the optical sheet group 21 and to correct the position shift if it occurs. However, in this case, the arrangement procedure of the optical sheet group 21 is complex.

In other words, by performing the first attaching step and the arrangement step in that order after the changing step is performed, it is possible to reliably attach the spacer 31 to the light guiding plate 22 and to further simplify the arrangement procedure of the optical sheet group 21.

The spacer 31 included in the display apparatus 1 described above can be formed simply as described in the description of the forming step. Moreover, since the spacer 31 is a bent plate, it is easy to reduce the weight as compared to a convex member, for example.

The display apparatus 1 is different from the liquid crystal display apparatus disclosed in Patent Document 1 in that the material, the shape, and the attachment method of the spacer 31 and the procedure of manufacturing the display apparatus 1 are different from those of the liquid crystal display apparatus.

In the case of the liquid crystal display apparatus disclosed in Patent Document 1, the spacer uses a synthetic resin rather than a shape memory alloy and the cross-sectional shape is a rectangular shape rather than a deformed Z-shape. Moreover, in the case of the liquid crystal display apparatus disclosed in Patent Document 1, an adhesive disposed adjacent to the spacer attaches the display panel and the light guiding plate together. On the other hand, in the case of the display apparatus 1, the adhesives applied to the panel attachment part 311 and the light guiding plate attachment part 312 of the spacer 31 attach the display panel 11 and the light guiding plate 22 together.

Furthermore, the liquid crystal display apparatus disclosed in Patent Document 1 is manufactured in such a procedure that the spacer is arranged after arrangement of the optical sheet group on the light guiding plate. Therefore, the position shift of the optical sheet described above may occur.

Embodiment 2

Figure 8:
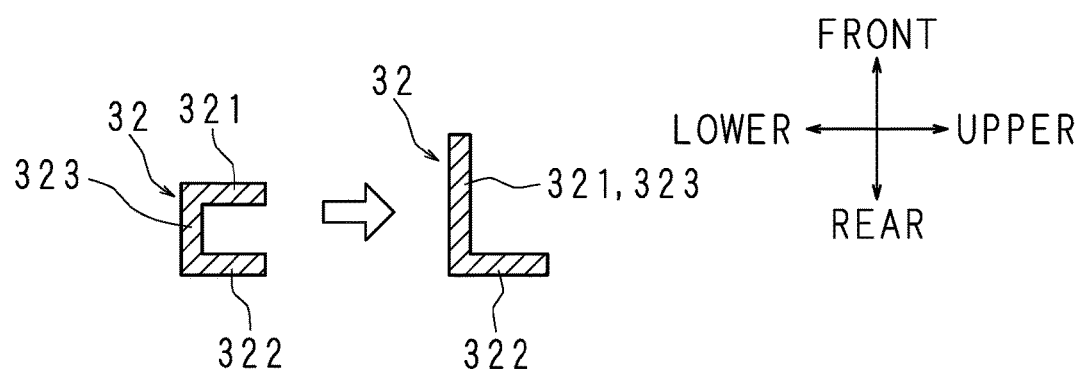
FIG. 8 is a side view for describing deformation of a spacer provided in a display apparatus according to Embodiment 2 of the present disclosure.

FIG. 8 is a side view for describing deformation of the spacer 32 included in a display apparatus 1 according to Embodiment 2 of the present disclosure.

Figure 9:
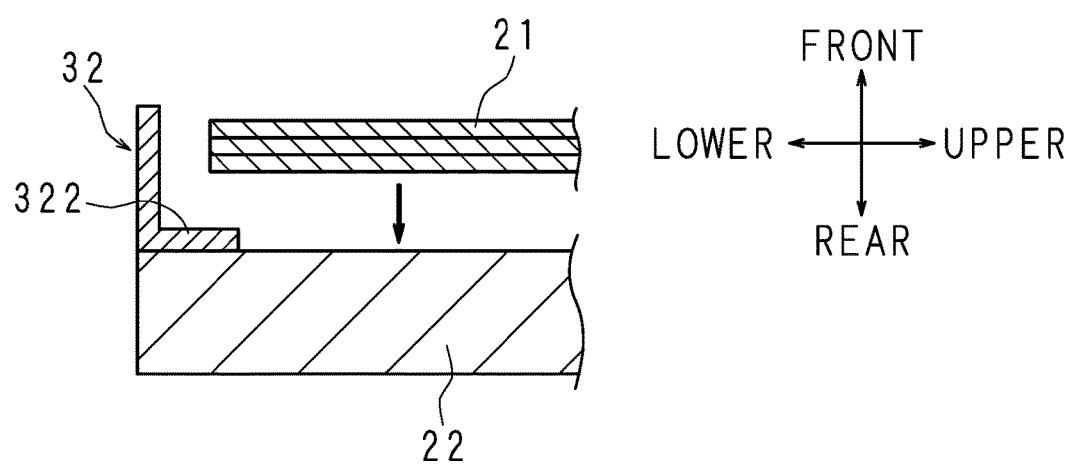
FIG. 9 is a side view for describing a method of manufacturing the display apparatus.
Figure 10:
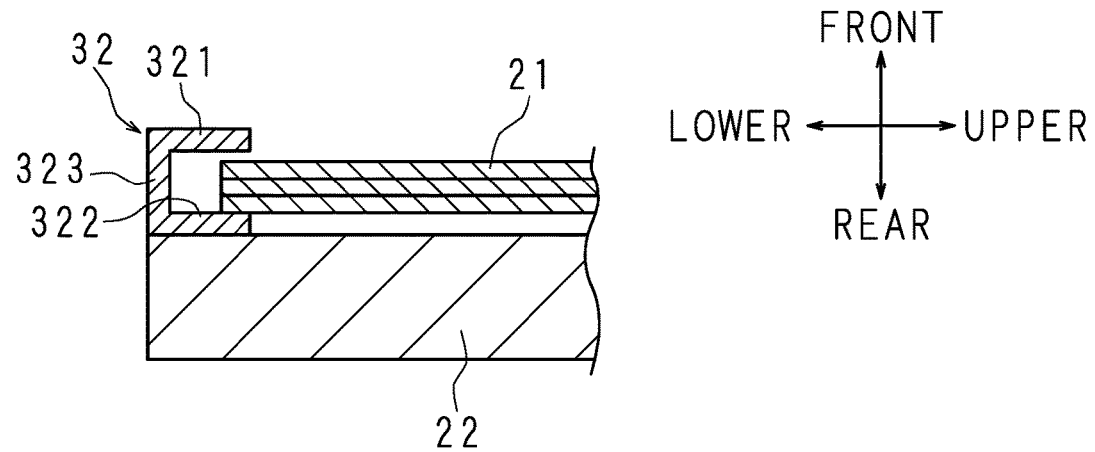
FIG. 10 is a side view for describing the method of manufacturing the display apparatus.
Figure 11:
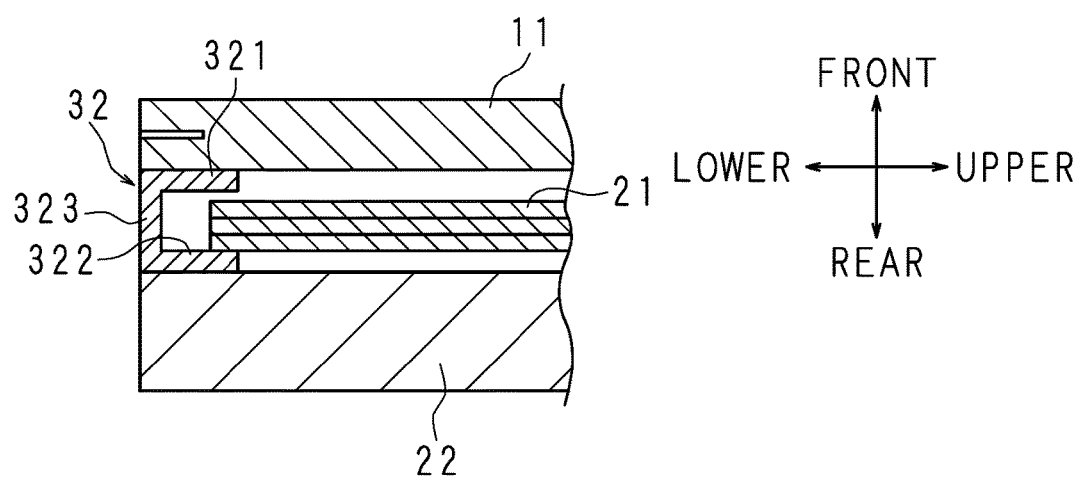
FIG. 11 is a side view for describing the method of manufacturing the display apparatus.

FIGS. 9 to 11 are side views for describing a method of manufacturing the display apparatus 1.

FIGS. 8 to 11 correspond to FIGS. 2 to 5 of Embodiment 1.

The display apparatus 1 of the present embodiment has approximately the same configuration as the display apparatus 1 of Embodiment 1. In the following description, the difference from Embodiment 1 will be described, and the same parts corresponding to those of Embodiment 1 will be denoted by the same reference numerals and the description thereof will not be provided.

The display apparatus 1 includes four spacers 32 instead of the four spacers 31 of Embodiment 1.

The spacers 32 have the same configuration and correspond to the upper side, the lower side, and the left and right sides of each of the display panel 11 and the light guiding plate 22 in one-to-one correspondence. A void is formed throughout an entire area between the display panel 11 and the light guiding plate 22 when the spacers 32 are interposed between the peripheral part of the rear surface of the display panel 11 and the peripheral part of the front surface of the light guiding plate 22.

In the following description, the spacer 32 corresponding to the lower side of each of the display panel 11 and the light guiding plate 22 will be described.

The spacer 32 is formed using a shape memory alloy. The spacer 32 includes a panel attachment part 321, a light guiding plate attachment part 322, and a connection part 323 that are integrated with each other and that correspond to the panel attachment part 311, the light guiding plate attachment part 312, and the connection part 313 of the spacer 31 of Embodiment 1.

However, the connection part 323 integrally connects the lower sides of the panel attachment part 321 and the light guiding plate attachment part 322. In other words, the panel attachment part 321 and the light guiding plate attachment part 322 protrude at the right angle in the same direction from the front and rear sides of the connection part 323.

That is, the spacer 32 is a bent plate obtained by bending a flat plate member in a C-shape.

The rear surface of the panel attachment part 321 is disposed to face the lower side of the front surface of the optical sheet group 21, and the front surface of the light guiding plate attachment part 322 is disposed to face the lower side of the rear surface of the optical sheet group 21. That is, the four sides of the optical sheet group 21 are disposed inside the spacers 32.

Next, a procedure of manufacturing the display apparatus 1 will be described.

The manufacturer forms the spacer 32 using a shape memory alloy (a forming step, see the spacer 32 on the left side in FIG. 8). In this step, the manufacturer prepares a flat plate member formed of a shape memory alloy, for example, and bends the flat plate member in a C-shape while performing a heat treatment at a predetermined temperature higher than the room temperature.

And then, the spacer 32 is cooled to a temperature lower than the predetermined temperature.

Subsequently, the manufacturer changes the relative direction of the panel attachment part 321 with respect to the light guiding plate attachment part 322 by adding external force to the spacer 32 (a changing step, see the spacer 32 on the right side in FIG. 8). Specifically, the manufacturer changes the relative direction of the panel attachment part 321 to a horizontal direction like the connection part 323 so that the spacer 32 has an L-shaped cross-section.

After that, the manufacturer applies an adhesive to the rear surface of the light guiding plate attachment part 322 of the spacer 32 to attach the light guiding plate attachment part 322 to the lower side of the front surface of the light guiding plate 22 (see FIG. 9, a first attaching step). Similarly, the manufacturer attaches the light guiding plate attachment part 322 of the spacer 32 to the upper side and the left and right sides of the front surface of the light guiding plate 22.

In this case, since the optical sheet group 21 is not disposed on the front surface of the light guiding plate 22, the spacers 32 can be attached to the light guiding plate 22 easily and reliably.

Subsequently, the manufacturer arranges the optical sheet group 21 to face the front surface of the light guiding plate 22 to attach the upper side of the optical sheet group 21 to the spacer 32 attached to the upper side of each of the light guiding plates 22 (see FIG. 10, an arrangement step). In this case, an arrangement position of the optical sheet group 21 is limited to a range surrounded by the four spacers 32 attached to the four sides of the light guiding plate 22. That is, the position of the optical sheet group 21 is determined. In other words, a position shift of the optical sheet group 21 does not occur.

After that, the manufacturer heats the spacer 32 to a predetermined temperature or higher. As a result, the relative direction of the panel attachment part 321 returns to an original direction due to the property of the shape memory alloy (see FIG. 10, a returning step).

Subsequently, the manufacturer applies an adhesive to the front surfaces of the panel attachment parts 321 of the four spacers 32 to attach the panel attachment parts 321 to the four sides of the rear surface of the display panel 11 (see FIG. 11, a second attaching step).

As a result, the light guiding plate 22 supports the display panel 11 with the spacers 32 interposed therebetween and supports the optical sheet group 21.

The display apparatus 1 of the present embodiment provides the same effect as the display apparatus 1 of Embodiment 1.

Embodiment 3

Figure 12:
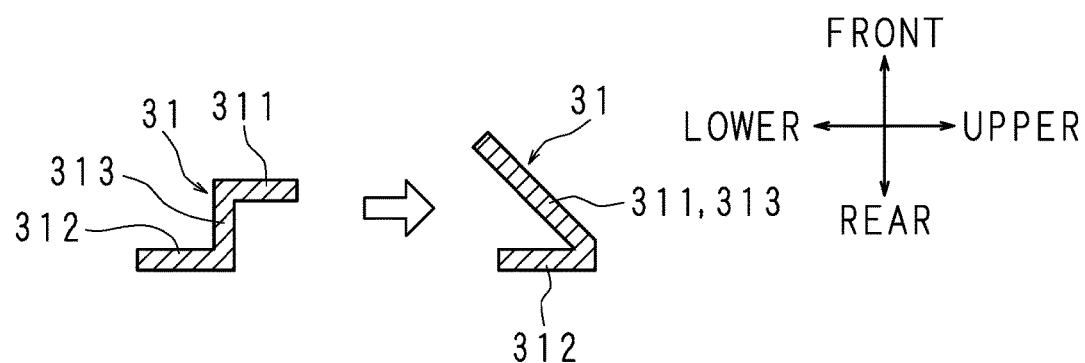
FIG. 12 is a side view for describing deformation of a spacer provided in a display apparatus according to Embodiment 3 of the present disclosure.

FIG. 12 is a side view for describing deformation of a spacer 31 included in a display apparatus 1 according to Embodiment 3 of the present disclosure.

Figure 13:
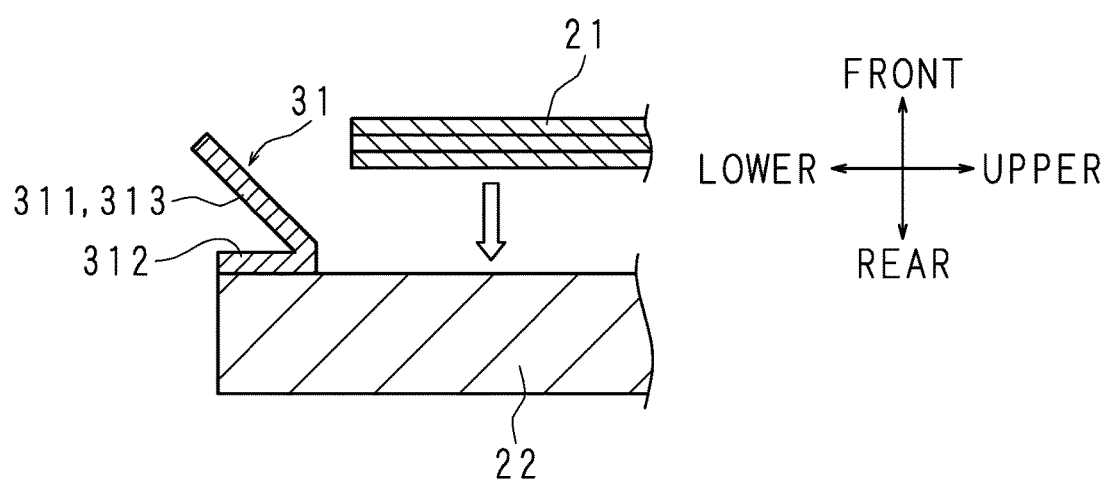
FIG. 13 is a side view for describing a method of manufacturing the display apparatus.

FIG. 13 is a side view for describing a method of manufacturing the display apparatus 1.

FIGS. 12 and 13 correspond to FIGS. 2 and 3 of Embodiment 1, respectively.

The display apparatus 1 of the present embodiment has approximately the same configuration as the display apparatus 1 of Embodiment 1. In the following description, the difference from Embodiment 1 will be described, and the same parts corresponding to those of Embodiment 1 will be denoted by the same reference numerals and the description thereof will not be provided.

Moreover, the manufacturer forms the spacer 31 using a shape memory alloy (a forming step, see the spacer 31 on the left side in FIG. 12).

And then, the spacer 31 is cooled to a temperature lower than the predetermined temperature.

Subsequently, the manufacturer changes the relative directions of the panel attachment part 311 and the connection part 313 with respect to the light guiding plate attachment part 312 by adding external force to the spacer 31 (a changing step, see the spacer 31 on the right side in FIG. 12). Specifically, the panel attachment part 311 and the connection part 313 are tilted in a direction of approaching the light guiding plate attachment part 312. In this case, the spacer 31 has a V-shaped cross-section and the rear surface of the panel attachment part 311 and the upper surface of the connection part 313 are inclined surfaces that are flush with each other.

After that, the manufacturer applies an adhesive to the rear surface of the light guiding plate attachment part 312 of the spacer 31 to attach the light guiding plate attachment part 312 to the lower side of the front surface of the light guiding plate 22 (see FIG. 13, a first attaching step). Similarly, the manufacturer attaches the light guiding plate attachment part 312 of the spacer 31 to the upper side and the left and right sides of the front surface of the light guiding plate 22.

Subsequently, the manufacturer arranges the optical sheet group 21 to face the front surface of the light guiding plate 22 to attach the upper side of the optical sheet group 21 to the upper side of the light guiding plate 22 (see FIG. 13, an arrangement step). In this case, the position of the optical sheet group 21 is determined by the four spacers 31. Furthermore, since the panel attachment parts 311 and the connection parts 313 of the spacers 31 are inclined so as to be separated from the arrangement position of the optical sheet group 21, the possibility that the spacers 31 disturbs the operation of arranging the optical sheet group 21 is lower than the case of Embodiment 1.

After that, the manufacturer performs the returning step and the second attaching step (see FIGS. 4 and 5, a returning step).

The display apparatus 1 of the present embodiment provides the same effect as the display apparatus 1 of Embodiment 1.

Embodiment 4

Figure 14:
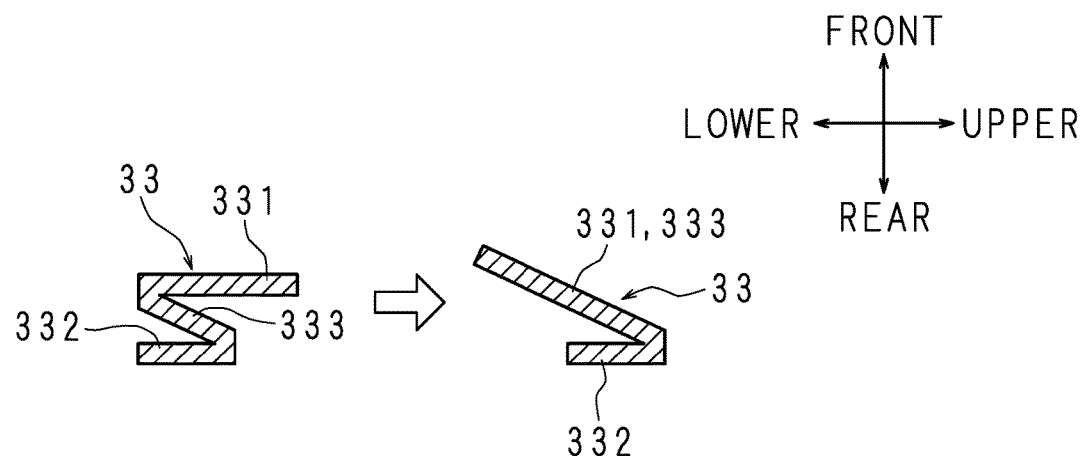
FIG. 14 is a side view for describing deformation of a spacer provided in a display apparatus according to Embodiment 4 of the present disclosure.

FIG. 14 is a side view for describing deformation of a spacer 33 included in a display apparatus 1 according to Embodiment 4 of the present disclosure. FIG. 14 corresponds to FIG. 2 of Embodiment 1.

The display apparatus 1 of the present embodiment has approximately the same configuration as the display apparatus 1 of Embodiment 1. In the following description, the difference from Embodiment 1 will be described, and the same parts corresponding to those of Embodiment 1 will be denoted by the same reference numerals and the description thereof will not be provided.

The display apparatus 1 includes four spacers 33 instead of the four spacers 31 of Embodiment 1.

The spacers 33 have the same configuration and correspond to the upper side, the lower side, and the left and right sides of each of the display panel 11 and the light guiding plate 22 in one-to-one correspondence. A void is formed throughout an entire area between the display panel 11 and the light guiding plate 22 when the spacers 33 are interposed between the peripheral part of the rear surface of the display panel 11 and the peripheral part of the front surface of the light guiding plate 22.

In the following description, the spacer 33 corresponding to the lower side of each of the display panel 11 and the light guiding plate 22 will be described (see the spacer 33 on the left side in FIG. 14).

The spacer 33 is formed using a shape memory alloy. The spacer 33 includes a panel attachment part 331, a light guiding plate attachment part 332, and a connection part 333 that are integrated with each other and that correspond to the panel attachment part 311, the light guiding plate attachment part 312, and the connection part 313 of the spacer 31 of Embodiment 1. The length in the upper-lower direction of the panel attachment part 331 is larger than the length in the upper-lower direction of the light guiding plate attachment part 332.

The connection part 333 is a rectangular flat plate shape that is narrow and long in the left-right direction and has such an inclined direction that the connection part 333 crosses the panel attachment part 331 and the light guiding plate attachment part 332 at an acute angle. The connection part 333 integrally connects the lower side of the panel attachment part 331 and the upper side of the light guiding plate attachment part 332. In other words, the panel attachment part 331 and the light guiding plate attachment part 332 protrude at the right angle in an opposite direction from the front side and the rear side of the connection part 333. That is, the spacer 33 is a bent plate obtained by bending a flat plate member in a Z-shape.

The rear surface of the panel attachment part 331 is disposed to face the lower side of the front surface of the optical sheet group 21.

The spacer 33 is used similarly to the spacer 31 of Embodiment 1.

However, during the changing step, the manufacturer changes the relative direction of the panel attachment part 331 with respect to the light guiding plate attachment part 332 by adding external force to the spacer 33 (see the spacer 33 on the right side in FIG. 14). Specifically, the relative direction of the panel attachment part 331 is changed to an inclined direction like the connection part 333. In this case, the spacer 33 has a V-shaped cross-section and the rear surface of the panel attachment part 331 and the upper surface of the connection part 333 are flush with each other.

The display apparatus 1 of the present embodiment provides the same effect as the display apparatus 1 of Embodiment 1.

Embodiment 5

FIG. 15 is a side view for describing deformation of a spacer 34 included in a display apparatus 1 according to Embodiment 5 of the present disclosure. FIG. 15 corresponds to FIG. 2 of Embodiment 1.

The display apparatus 1 of the present embodiment has approximately the same configuration as the display apparatus 1 of Embodiment 1. In the following description, the difference from Embodiment 1 will be described, and the same parts corresponding to those of Embodiment 1 will be denoted by the same reference numerals and the description thereof will not be provided.

The display apparatus 1 includes four spacers 34 instead of the four spacers 31 of Embodiment 1.

The spacers 34 have the same configuration and correspond to the upper side, the lower side, and the left and right sides of each of the display panel 11 and the light guiding plate 22 in one-to-one correspondence. A void is formed throughout an entire area between the display panel 11 and the light guiding plate 22 when the spacers 34 are interposed between the peripheral part of the rear surface of the display panel 11 and the peripheral part of the front surface of the light guiding plate 22.

In the following description, the spacer 34 corresponding to the lower side of each of the display panel 11 and the light guiding plate 22 will be described (see the spacer 34 on the left side in FIG. 15).

The spacer 33 is formed using a shape memory alloy. The spacer 33 includes a panel attachment part 331, a light guiding plate attachment part 332, and a connection part 333 that are integrated with each other and that correspond to the panel attachment part 311, the light guiding plate attachment part 312, and the connection part 313 of the spacer 31 of Embodiment 1.

However, the connection part 343 has such an inclined direction that the connection part 343 crosses the panel attachment part 341 and the light guiding plate attachment part 342 at an obtuse angle.

The rear surface of the panel attachment part 341 is disposed to face the lower side of the front surface of the optical sheet group 21.

The spacer 34 is used similarly to the spacer 31 of Embodiment 1.

However, during the changing step, the manufacturer changes the relative directions of the panel attachment part 341 and the connection part 343 with respect to the light guiding plate attachment part 342 by adding external force to the spacer 34 and the connection part 343 (see the spacer 34 on the right side in FIG. 15). Specifically, the relative directions of the panel attachment part 341 and the connection part 343 are changed to horizontal directions. In this case, the spacer 34 has an L-shaped cross-section and the rear surface of the panel attachment part 341 and the upper surface of the connection part 343 are flush with each other.

The display apparatus 1 of the present embodiment provides the same effect as the display apparatus 1 of Embodiment 1.

The spacers 31 to 34 of Embodiments 1 to 5 are bent plates having a deformed Z-shaped, a C-shaped, or a Z-shaped cross-section. However, the cross-sectional shape is not limited to this, and, for example, the spacer may be a bent plate having a U-shaped cross-section or a member having an H-shaped cross-section.

Embodiment 6

Figure 16:
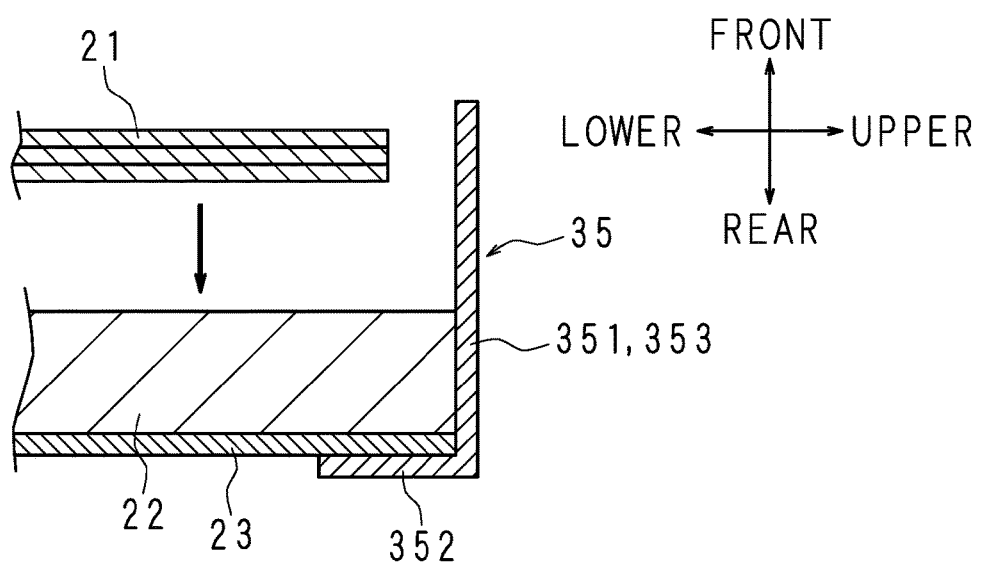
FIG. 16 is a side view for describing a method of manufacturing a display apparatus according to Embodiment 6 of the present disclosure.
Figure 17:
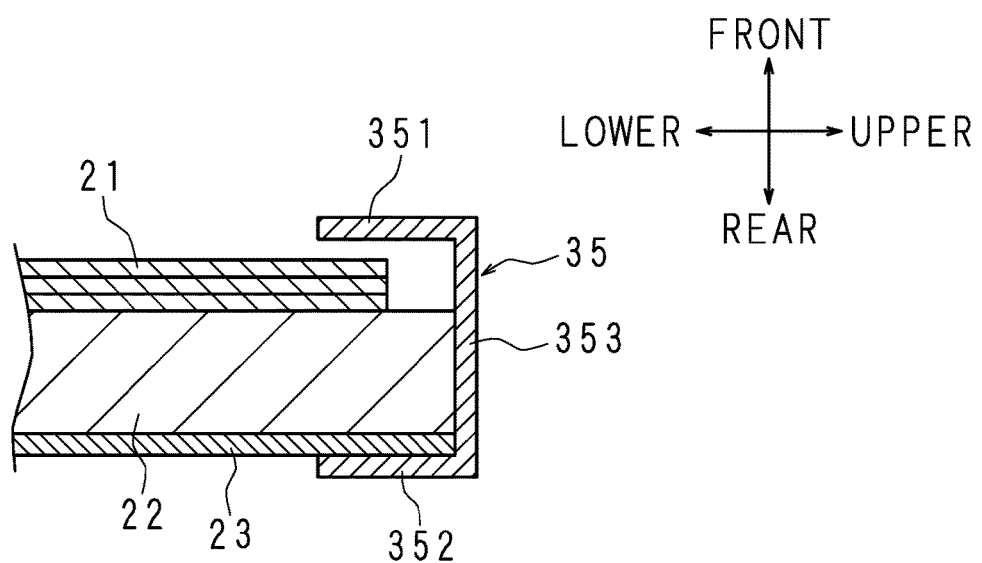
FIG. 17 is a side view for describing the method of manufacturing the display apparatus.
Figure 18:
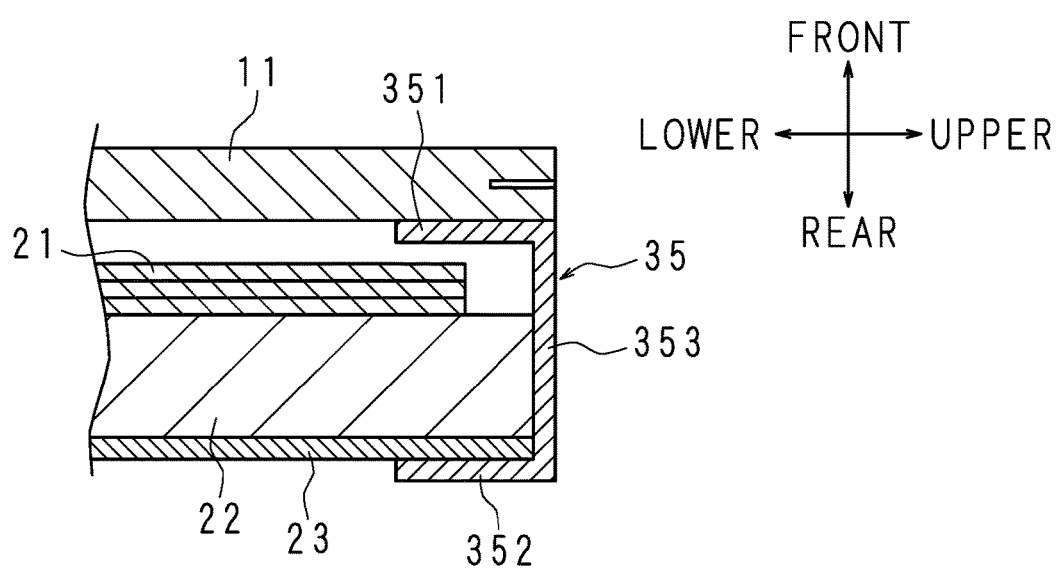
FIG. 18 is a side view for describing the method of manufacturing the display apparatus.

FIGS. 16 to 18 are side views for describing a method of manufacturing a display apparatus 1 according to Embodiment 6 of the present disclosure. FIGS. 16 to 18 correspond to FIGS. 3 to 5 of Embodiment 1, and the reflecting sheet 23 is illustrated without being omitted.

The display apparatus 1 of the present embodiment has approximately the same configuration as the display apparatus 1 of Embodiment 2. In the following description, the difference from Embodiment 2 will be described, and the same parts corresponding to those of Embodiment 2 will be denoted by the same reference numerals and the description thereof will not be provided.

The display apparatus 1 includes the spacer 32 of Embodiment 2 and three spacers 35 instead of the four spacers 31 of Embodiment 1.

The spacer 32 corresponds to the lower side of each of the display panel 11 and the light guiding plate 22. The spacers 35 have the same configuration and correspond to the upper side and the left and right sides of each of the display panel 11 and the light guiding plate 22 in one-to-one correspondence. A void is formed throughout an entire area between the display panel 11 and the light guiding plate 22 when the spacer 32 and the spacers 35 are interposed between the peripheral part of the rear surface of the display panel 11 and the peripheral part of the front surface of the light guiding plate 22.

In the following description, the spacer 35 corresponding to the upper side of each of the display panel 11 and the light guiding plate 22 will be described.

The spacer 35 is formed using a shape memory alloy. The spacer 35 includes a panel attachment part 351, a light guiding plate attachment part 352, and a connection part 353 that are integrated with each other and that correspond to the panel attachment part 321, the light guiding plate attachment part 322, and the connection part 323 of the spacer 32 of Embodiment 1.

The panel attachment part 351 is attached to the peripheral part of the rear surface of the display panel 11 so as to be disposed along the display panel 11. The light guiding plate attachment part 352 is attached to the peripheral part of the rear surface of the light guiding plate 22 so as to be disposed along the light guiding plate 22 with the reflecting sheet 23 interposed therebetween.

Specifically, the panel attachment part 351 and the light guiding plate attachment part 352 have a rectangular flat plate shape having a vertical direction that is narrow and long in the left-right direction. The front surface of the panel attachment part 351 is attached to the upper side of the rear surface of the display panel 11. The front surface of the light guiding plate attachment part 352 is attached to the upper side of the rear surface of the reflecting sheet 23 and the rear surface of the light guiding plate attachment part 352 is attached to the BL chassis 24.

The connection part 353 has a rectangular flat plate shape that is narrow and long in the left-right direction and has a horizontal direction that is orthogonal to the panel attachment part 351 and the light guiding plate attachment part 352. The connection part 353 integrally connects the upper sides of the panel attachment part 351 and the light guiding plate attachment part 352. In other words, the panel attachment part 351 and the light guiding plate attachment part 352 protrude at the right angle in the same direction from the front and rear sides of the connection part 353.

That is, the spacer 35 is a bent plate obtained by bending a flat plate member in a C-shape.

The rear surface of the panel attachment part 351 is disposed to face the upper side of the front surface of the optical sheet group 21.

The lower surface of the connection part 353 covers the upper end surface of the light guiding plate 22 and the upper end of the reflecting sheet 23. As a result, light leaking through the upper end surface of the light guiding plate 22 toward the outside of the light guiding plate 22 is suppressed.

The reason why the spacer corresponding to the lower side of each of the display panel 11 and the light guiding plate 22 is the spacer 32 rather than the spacer 35 is because light derived from the light source 25 cannot be incident on the lower end surface of the light guiding plate 22 if the spacer 35 is arranged to correspond to the lower side of each of the display panel 11 and the light guiding plate 22.

The spacer 32 is not necessary if the display panel 11 and the light guiding plate 22 can be supported sufficiently by the three spacers 35. Moreover, any one of the spacers 31, 33, and 34 may be provided instead of the spacer 32.

Next, a procedure of manufacturing the display apparatus 1 will be described. However, since the procedure of attaching the spacer 32 is the same as that of Embodiment 2, the description thereof will not be provided.

The manufacturer forms the spacer 35 using a shape memory alloy (a forming step, see the spacer 35 illustrated in FIG. 17 or 18).

And then, the spacer 35 is cooled to a temperature lower than the predetermined temperature.

Subsequently, the manufacturer changes the relative direction of the panel attachment part 351 with respect to the light guiding plate attachment part 352 by adding external force to the spacer 35 (a changing step, see the spacer 35 on the right side in FIG. 16). Specifically, the relative direction of the panel attachment part 351 is changed to a horizontal direction like the connection part 353. In this case, the spacer 35 has an L-shaped cross-section and the rear surface of the panel attachment part 351 and the lower surface of the connection part 353 are flush with each other.

After that, the manufacturer applies an adhesive to the rear surface of the light guiding plate attachment part 352 of the spacer 35 to attach the light guiding plate attachment part 352 to the BL chassis 24 (this step is not illustrated).

Subsequently, the manufacturer applies an adhesive to the front surface of the light guiding plate attachment part 352 of the spacer 35 to attach the upper side of the rear surface of the reflecting sheet 23 to the light guiding plate attachment part 352 to attach the spacer 35 to the BL chassis 24 (see FIG. 16, a first attaching step). Similarly, the manufacturer attaches the light guiding plate attachment part 352 of the spacer 35 to the left and right sides of the rear surface of the reflecting sheet 23 to attach the spacer 35 to the BL chassis 24.

After that, the manufacturer attaches the light guiding plate 22 to the reflecting sheet 23 and the BL chassis 24 (see FIG. 16).

Subsequently, the manufacturer arranges the optical sheet group 21 to face the front surface of the light guiding plate 22 to attach the upper side of the optical sheet group 21 to the upper side of the light guiding plate 22 (see FIG. 16, an arrangement step). In this case, the position of the optical sheet group 21 is determined by the spacer 32 and the spacers 35.

After that, the manufacturer heats the spacer 35 to a predetermined temperature or higher. As a result, the relative direction of the panel attachment part 351 returns to an original direction due to the property of the shape memory alloy (see FIG. 17, a returning step).

Subsequently, the manufacturer applies an adhesive to the front surfaces of the panel attachment parts 351 of the spacers 35 to attach the spacer 35 to the upper side and the left and right sides of the rear surface of the display panel 11 (see FIG. 18, a second attaching step).

The display apparatus 1 of the present embodiment provides the same effect as the display apparatus 1 of Embodiment 2.

Embodiment 7

Figure 19:
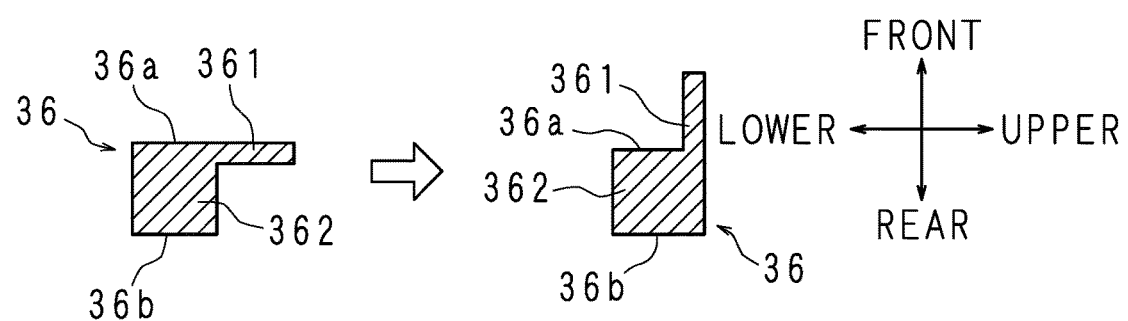
FIG. 19 is a side view for describing deformation of a spacer provided in a display apparatus according to Embodiment 7 of the present disclosure.

FIG. 19 is a side view for describing deformation of a spacer 36 included in a display apparatus 1 according to Embodiment 7 of the present disclosure.

Figure 20:
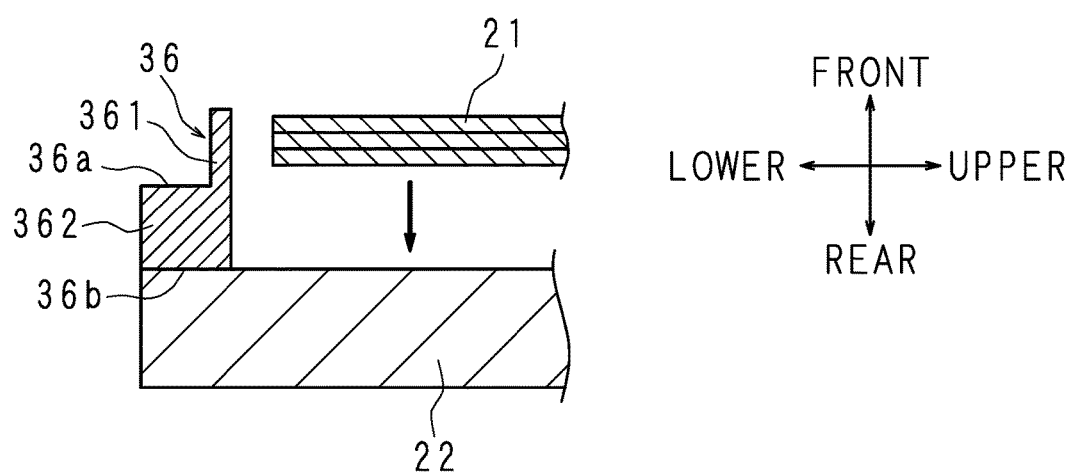
FIG. 20 is a side view for describing a method of manufacturing the display apparatus.
Figure 21:
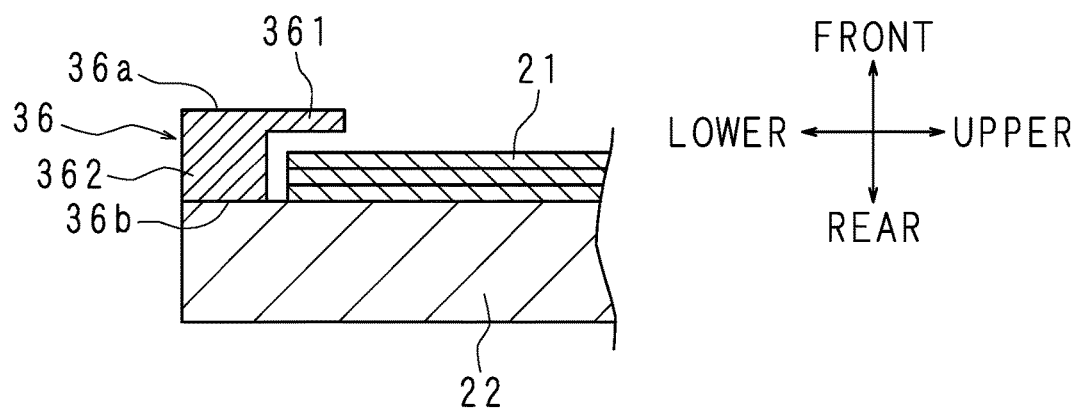
FIG. 21 is a side view for describing the method of manufacturing the display apparatus.
Figure 22:
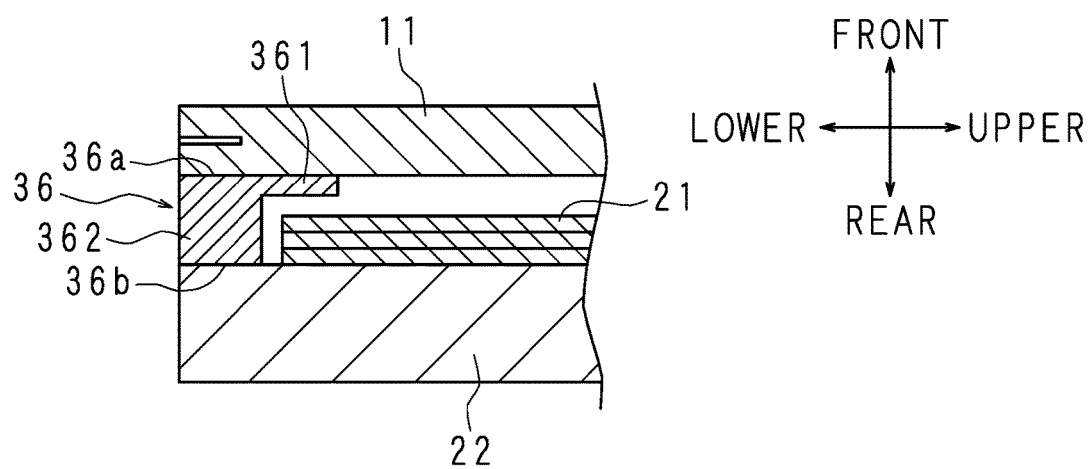
FIG. 22 is a side view for describing the method of manufacturing the display apparatus.

FIGS. 20 to 22 are side views for describing a method of manufacturing the display apparatus 1.

FIGS. 19 to 22 correspond to FIGS. 2 to 5 of Embodiment 1, respectively.

The display apparatus 1 of the present embodiment has approximately the same configuration as the display apparatus 1 of Embodiment 1. In the following description, the difference from Embodiment 1 will be described, and the same parts corresponding to those of Embodiment 1 will be denoted by the same reference numerals and the description thereof will not be provided.

The display apparatus 1 includes four spacers 36 instead of the four spacers 31 of Embodiment 1.

The spacers 36 have the same configuration and correspond to the upper side, the lower side, and the left and right sides of each of the display panel 11 and the light guiding plate 22 in one-to-one correspondence. A void throughout an entire area between the display panel 11 and the light guiding plate 22 is formed when the spacers 36 are interposed between the peripheral part of the rear surface of the display panel 11 and the peripheral part of the front surface of the light guiding plate 22.

In the following description, the spacer 36 corresponding to the lower side of each of the display panel 11 and the light guiding plate 22 will be described.

The spacer 36 is formed using a shape memory alloy. The spacer 36 includes a panel attachment part 361 and a light guiding plate attachment part 362 that are integrated with each other.

The panel attachment part 361 is attached to the peripheral part of the rear surface of the display panel 11 so as to be disposed along the display panel 11. Specifically, the panel attachment part 361 has a rectangular flat plate shape having a vertical direction that is narrow and long in the left-right direction. The front surface of the panel attachment part 361 is attached to the lower side of the rear surface of the display panel 11.

The rear surface of the panel attachment part 361 is disposed to face the lower side of the front surface of the optical sheet group 21.

The light guiding plate attachment part 362 is attached to the peripheral parts of the rear surface of the display panel 11 and the front surface of the light guiding plate 22. Specifically, the light guiding plate attachment part 362 has a rectangular block shape and has a front surface 36a and a rear surface 36b that have a planar shape. The front surface 36a is adjacent to the front surface of the panel attachment part 361 and is in contact with the lower side of the rear surface of the display panel 11 with an adhesive interposed therebetween. The rear surface 36b is in contact with the lower side of the front surface of the light guiding plate 22 with an adhesive interposed therebetween. That is, the front surface 36a and the rear surface 36b function as a panel contacting surface and a light guiding plate contacting surface in the embodiment of the present disclosure.

The panel attachment part 361 protrudes upward from the light guiding plate attachment part 362 in order that the front surface 36a is flush with the front surface of the panel attachment part 361 and the upper surface of the light guiding plate attachment part 362 is orthogonal to the rear surface of the panel attachment part 361.

The front surface 36a may not be in contact with the display panel 11 as long as the contact surface by the front surface of the panel attachment part 361 is sufficiently large.

Next, a procedure of manufacturing the display apparatus 1 will be described.

The manufacturer forms the spacer 36 using a shape memory alloy (a forming step, see the spacer 36 on the left side in FIG. 19).

And then, the spacer 36 is cooled to a temperature lower than the predetermined temperature.

Subsequently, the manufacturer changes the relative direction of the panel attachment part 361 with respect to the light guiding plate attachment part 362 by adding external force to the spacer 36 (a changing step, see the spacer 36 on the right side in FIG. 19). Specifically, the manufacturer changes the relative direction of the panel attachment part 361 to a horizontal direction by tilting the panel attachment part 361 in front. In this case, the upper surface of the light guiding plate attachment part 362 and the rear surface of the panel attachment part 371 are flush with each other and the front surface 36a and the front surface of the panel attachment part 361 are orthogonal to each other.

After that, the manufacturer applies an adhesive to the rear surface 36b of the light guiding plate attachment part 362 of the spacer 36 and attaches the light guiding plate attachment part 362 to the lower side of the front surface of the light guiding plate 22 (see FIG. 20, a first attaching step). During the attachment, the spacer 36 is oriented in such a direction that the rear surface of the panel attachment part 361 and the upper surface of the light guiding plate attachment part 362 that are flush with each other face upward.

Similarly, the manufacturer attaches the light guiding plate attachment part 362 of the spacer 36 to the upper side and the left and right sides of the front surface of the light guiding plate 22.

In this case, since the optical sheet group 21 is not disposed on the front surface of the light guiding plate 22, the spacers 36 can be attached to the light guiding plate 22 easily and reliably.

Subsequently, the manufacturer arranges the optical sheet group 21 to face the front surface of the light guiding plate 22 to attach the upper side of the optical sheet group 21 to the upper side of the light guiding plate 22 (see FIG. 20, an arrangement step). In this case, an arrangement position of the optical sheet group 21 is defined by the spacer 36 (specifically, the arrangement position is limited to a range surrounded by the four spacers 36 attached to the four sides of the light guiding plate 22). That is, the position of the optical sheet group 21 is determined. In other words, a position shift of the optical sheet group 21 does not occur.

After that, the manufacturer heats the spacer 36 to a predetermined temperature or higher. As a result, the relative direction of the panel attachment part 361 returns to an original direction due to the property of the shape memory alloy (see FIG. 21, a returning step).

Subsequently, the manufacturer applies an adhesive to the front surfaces of the panel attachment parts 361 of the four spacers 36 and the front surfaces 36a of the light guiding plate attachment parts 362 to attach the spacers to the four sides of the rear surface of the display panel 11 (see FIG. 22, a second attaching step).

As a result, the light guiding plate 22 supports the display panel 11 with the spacers 36 interposed therebetween and supports the optical sheet group 21.

In the spacer 36 included in the display apparatus 1 described above, the front surface of the panel attachment part 361 of the spacer 36 and the front surface 36a of the light guiding plate attachment part 362 are attached to the display panel 11. Therefore, the display panel 11 can be supported by the panel attachment part 361 and the light guiding plate attachment part 362 more reliably than when the front surface 36a is not in contact with the display panel 11. Moreover, the spacer 36 is less easily separated from the display panel 11 than when only the front surface of the panel attachment part 361 is attached.

Furthermore, since the light guiding plate attachment part 362 is interposed between the display panel 11 and the light guiding plate 22, the spacer 36 is less likely to be deformed unnecessarily even when unnecessary external force (particularly, compressive force applied to the light guiding plate attachment part 362 in the direction of approaching the display panel 11 and the light guiding plate 22) than when a plate-shaped member is interposed between the display panel 11 and the light guiding plate 22. That is, the reliability of the spacer 36 is high.

The spacers 31 to 34 of Embodiments 1 to 5 and the spacer 36 of Embodiment 7 are not limited to a configuration in which the spacers are arranged on the four sides of each of the display panel 11 and the light guiding plate 22, but the spacers may be arranged two or three sides of the four sides.

It should be understood that the embodiments disclosed herein are illustrative and non-restrictive in every respect. Since the scope of the present disclosure is defined by the appended claims rather than by the description preceding them, and all changes that fall within metes and bounds of the claims, or equivalence of such metes and bounds thereof are therefore intended to be embraced by the claims.

Moreover, as long as the effect of the present disclosure can be produced, the display apparatus 1 may include components not disclosed in Embodiments 1-7.

The components (technical features) disclosed in each example embodiment may be combined with one another, and such combinations may form new technical features.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A display apparatus comprising:
a display panel which has a front surface for displaying an image and a rear surface which is opposite to the front surface;
an optical sheet which has a front surface facing the rear surface of the display panel, and a rear surface which is opposite to the front surface;
a light guiding plate that emits light, the light being derived from a light source, through a front surface of the light guiding plate toward the rear surface of the optical sheet; and
a spacer that extends in a longitudinal direction of a side surface of the light guiding plate and forms a void between the display panel and the light guiding plate at which the optical sheet is arranged;
wherein:
the spacer is a U-shaped bent plate made of a shape memory alloy, wherein there are no parts extending from the U-shaped bent plate,
the spacer consists of:
a panel attachment part having a flat plate shape which has a front surface attached to a peripheral part of the rear surface of the display panel;
a light guiding plate attachment part having a flat plate shape which has a front surface attached to a peripheral part of a rear surface of the light guiding plate which is opposite to the front surface of the light guiding plate; and
a connection part having a flat plate shape that integrally connects the panel attachment part and the light guiding plate attachment part, and
the rear surface of the panel attachment part does not contact with the optical sheet;
and further wherein:
the light guiding plate attachment part of the spacer is positioned outside a space between the display panel and the light guiding plate, and the spacer has a U-shaped cross-section orthogonal to the longitudinal direction, wherein the spacer only contacts the display panel and the light guiding plate, and
the spacer does not connect to any portions which are configured outside the light guiding plate in the longitudinal direction.

2. The display apparatus according to claim 1, wherein the light guiding plate attachment part is disposed along the light guiding plate.

3. The display apparatus according to claim 2, wherein the connection part integrally connects the peripheral parts of the panel attachment part and the light guiding plate attachment part and has such a flat plate shape that crosses the panel attachment part and the light guiding plate attachment part, and the spacer is a bent plate having a connecting portion between the panel attachment part and the connection part and having a connecting portion between the light guiding plate attachment part and the connection part, the connecting portion between the panel attachment part and the connection part and the connecting portion between the light guiding plate attachment part and the connection part being bent.

4. A method of manufacturing the display apparatus according to claim 1, comprising:

a forming step of forming the spacer using a shape memory alloy, the spacer including the panel attachment part having a plate shape to be attached to the display panel and the light guiding plate attachment part to be attached to the light guiding plate;

a first attaching step of attaching the light guiding plate attachment part of the spacer to a peripheral part of the rear surface of the light guiding plate;

an arranging step of arranging the optical sheet to face the front surface of the light guiding plate after the first attaching step;

a changing step of changing a relative direction of the panel attachment part in relation to the light guiding plate attachment part by applying external force to the spacer within a period after the forming step and before the first attaching step or a period after the first attaching step and before the arranging step;

a returning step of returning the relative direction of the panel attachment part to an original direction by heating the spacer after the arrangement step; and a second attaching step of attaching the panel attachment part to a peripheral part of the rear surface of the display panel, the rear surface being to face the optical sheet, in order that the panel attachment part is disposed along the display panel after the returning step.

* * * * *